US007796591B2

(12) United States Patent  
Peschi et al.

(10) Patent No.: US 7,796,591 B2
(45) Date of Patent: Sep. 14, 2010

(54) ACCESS MULTIPLEXER

(75) Inventors: Robert Nicolas Louis Peschi, Woluwe-Saint-Lambert (BE); Rafael Huysegems, Walem (BE); Wouter Dirk Helena De Maere, Sint-Niklaas (BE)

(73) Assignee: Alcatel-Lucent, Paris (FR)

( * ) Notice: Subject to any disclaimer, the term of this patent is extended or adjusted under 35 U.S.C. 154(b) by 421 days.

(21) Appl. No.: 11/510,829

(22) Filed: Aug. 28, 2006

(65) Prior Publication Data

US 2007/0064693 A1    Mar. 22, 2007

(30) Foreign Application Priority Data

Aug. 29, 2005 (EP) ................... 05291801

(51) Int. Cl.
*H04L 12/28* (2006.01)
(52) U.S. Cl. .................................. 370/389
(58) Field of Classification Search ............. 370/260, 370/376, 432, 390
See application file for complete search history.

(56) References Cited

U.S. PATENT DOCUMENTS

| 6,778,540 | B1 | 8/2004 | Ratcliff et al. |
| 6,931,005 | B1 * | 8/2005 | Wilhelm ............. 370/390 |
| 6,954,454 | B1 * | 10/2005 | Schuster et al. ........ 370/352 |
| 7,136,384 | B1 * | 11/2006 | Wang ................ 370/395.1 |
| 7,245,614 | B1 * | 7/2007 | Podar et al. ........... 370/389 |
| 2004/0125818 | A1 * | 7/2004 | Richardson et al. ...... 370/432 |
| 2004/0202199 | A1 | 10/2004 | Fischer et al. |
| 2005/0002398 | A1 | 1/2005 | Aboukarr et al. |
| 2005/0157711 | A1 | 7/2005 | O'Dell et al. |

OTHER PUBLICATIONS

Carl Oppedahl (Ruby Ranch Internet Cooperation), "Getting the Netopia 3342 working with the Copper Mountain IP netmodel", Aug. 1, 2004, http://www.rric.net/3342, All pages.*

* cited by examiner

*Primary Examiner*—Chirag G Shah
*Assistant Examiner*—Otis L Thompson, Jr.
(74) *Attorney, Agent, or Firm*—Harness, Dickey & Pierce, P.L.C.

(57) ABSTRACT

In access multiplexers (1) for multiplexing Internet Protocol packets to be exchanged between network devices (2) and subscriber devices (3-5), the Internet Protocol packets are encapsulated at each side of the access multiplexers (1). By providing the access multiplexers (1) with Internet Protocol routers (6-8) for routing the Internet Protocol packets via direction dependent routes, the access multiplexers (1) have become transparent for routing protocols at Internet Protocol level which use multicast Internet Protocol destination addresses or broadcast Internet Protocol destination addresses. Between the network devices (2) and the access multiplexers (1) Ethernet packets are exchanged via virtual local area network connections (21-23) and between the subscriber devices (3-5) and the access multiplexers (1) Asynchronous Transfer Mode packets are exchanged via permanent virtual connections (31-33). The access multiplexers (1) are digital subscriber line access multiplexers and the network devices (2) comprise edge routers and the subscriber devices (3-5) comprise customer premises equipment.

10 Claims, 2 Drawing Sheets

ACCESS MULTIPLEXER

PRIORITY STATEMENT

This application claims priority under 35 U.S. §119 to European Patent Application No. 05291801.8, filed on Aug. 29, 2005, in the European Patent Office (EPO), the entire contents of which is incorporated herein by reference.

BACKGROUND

1. Field

The invention relates to an access multiplexer for multiplexing Internet Protocol packets to be exchanged between a network device and a subscriber device, the Internet Protocol packets being encapsulated, between the network device and the access multiplexer, in first packets comprising first encapsulations and, between the subscriber device and the access multiplexer, in second packets comprising second encapsulations.

2. Description of Related Art

A prior art access multiplexer is of common general knowledge. Such an access multiplexer couples a network device and a subscriber device with each other and allows an exchange of Internet Protocol packets between the network device and the subscriber device in two directions. In a first direction, for example from network device to subscriber device, at the network device the Internet Protocol packets are encapsulated via first encapsulations, at a network side of the access multiplexer the Internet Protocol packets are decapsulated, at a subscriber side of the access multiplexer the Internet Protocol packets are encapsulated via second encapsulations, and at the subscriber device the Internet Protocol packets are decapsulated. In a second direction, for example from subscriber device to network device, at the subscriber device the Internet Protocol packets are encapsulated via the second encapsulations, at a subscriber side of the access multiplexer the Internet Protocol packets are decapsulated, at a network side of the access multiplexer the Internet Protocol packets are encapsulated via the first encapsulations, and at the network device the Internet Protocol packets are decapsulated.

The known access multiplexer is disadvantageous, inter alia, owing to the fact that it does not allow routing protocols which use multicast Internet Protocol destination addresses or broadcast Internet Protocol destination addresses to be run transparently between the network device and the subscriber device. Instead, in the prior art, the access multiplexer terminates such routing protocols, leading to a situation where the routing protocols are respectively terminated and instantiated in the access multiplexer. A first instance runs between the network device and the access multiplexer where it is terminated and a second instance runs between the access multiplexer and the customer device. Examples of such routing protocols are the Routing Information Protocol and the Open Shortest Path First Protocol.

SUMMARY

It is an object of the invention, inter alia, to provide an access multiplexer as defined above that can handle routing protocols, which use multicast Internet Protocol destination addresses or broadcast Internet Protocol destination addresses, in a more sophisticated way.

The access multiplexer according to the invention is characterized in that the access multiplexer comprises an Internet Protocol router for routing the Internet Protocol packets via direction dependent routes.

By introducing the Internet Protocol router into the access multiplexer, which Internet Protocol router has at least two routes available, one for each direction, the access multiplexer has become transparent for routing protocols at Internet Protocol level which use multicast Internet Protocol destination addresses or broadcast Internet Protocol destination addresses. In the first direction, a first route is used and in the second direction, a second route is used.

The access multiplexer according to the invention is further advantageous, inter alia, in that it can handle unicast traffic as well as multicast traffic as well as broadcast traffic in a sophisticated way. The Internet Protocol destination addresses define the traffic to be unicast traffic, multicast traffic or broadcast traffic.

Prior art access multiplexers cannot forward Internet Protocol packets with a given multicast Internet Protocol destination address or broadcast Internet Protocol destination address in a bidirectional way, because they only use routes which are direction independent. In particular, prior art access multiplexers only have one default route available. So, they cannot handle Internet Protocol packets with a given multicast Internet Protocol destination address or broadcast Internet Protocol destination address the way they should be handled.

It should be noted that U.S. Pat. No. 6,778,540 discloses a facility for forwarding data from a network adapter to a router partition without Internet Protocol processing. As disclosed in column 4 lines 8-14 of U.S. Pat. No. 6,778,540, this facility only has one default route available. This one default route is direction independent and is used for all directions.

An embodiment of the access multiplexer according to the invention is characterized in that the direction dependent routes comprise at least two default routes for routing an Internet Protocol packet comprising a multicast Internet Protocol destination address or a broadcast Internet Protocol destination address from a network interface of the access multiplexer to a subscriber interface of the access multiplexer and for routing an Internet Protocol packet comprising the multicast Internet Protocol destination address or the broadcast Internet Protocol destination address from the subscriber interface of the access multiplexer to the network interface of the access multiplexer.

Especially for the situation based on default routes and on Internet Protocol packets comprising multicast Internet Protocol destination addresses or broadcast Internet Protocol destination addresses, the invention solves the above identified problem. However, for other routes than the default routes and for other Internet Protocol packets comprising other Internet Protocol destination addresses than the multicast Internet Protocol destination addresses or the broadcast Internet Protocol destination addresses, the invention will be advantageous as well.

An embodiment of the access multiplexer according to the invention is characterized in that the first packets are Ethernet packets with the first encapsulations being Ethernet encapsulations and in that the second packets are Asynchronous Transfer Mode packets with the second encapsulations being Asynchronous Transfer Mode encapsulations. Other mutually different or mutually identical encapsulations are not to be excluded.

An embodiment of the access multiplexer according to the invention is characterized in that the access multiplexer is a digital subscriber line access multiplexer and the network device comprises an edge router and the subscriber device comprises customer premises equipment. Other kinds of multiplexers and devices are not to be excluded.

An embodiment of the access multiplexer according to the invention is characterized in that the access multiplexer comprises a network coupling that is coupled via a virtual local area network connection to the network device and a subscriber coupling that is coupled via a permanent virtual connection to the subscriber device. These connections are advantageously used in combination with the Ethernet encapsulations and the Asynchronous Transfer Mode encapsulations. Other kinds of connections are not to be excluded.

An embodiment of the access multiplexer according to the invention is characterized in that a first direction flows from the network coupling to the subscriber coupling and a second direction flows from the subscriber coupling to the network coupling, a first route flowing from the subscriber coupling to the subscriber device and a second route flowing from the network coupling to the network device. In other words, per communication between the network device and the subscriber device, the first (default) route is used in the first direction and the second (default) route is used in the second direction.

An embodiment of the access multiplexer according to the invention is characterized in that the access multiplexer comprises a network decapsulator coupled to the network coupling for decapsulating incoming first packets, the decapsulated first packets being first Internet Protocol packets, and a subscriber encapsulator coupled to the subscriber coupling for encapsulating the first Internet Protocol packets, the encapsulated first Internet Protocol packets being outgoing second packets.

An embodiment of the access multiplexer according to the invention is characterized in that the access multiplexer comprises a subscriber decapsulator coupled to the subscriber coupling for decapsulating incoming second packets, the decapsulated second packets being second Internet Protocol packets, and a network encapsulator coupled to the network coupling for encapsulating the second Internet Protocol packets, the encapsulated second Internet Protocol packets being outgoing first packets.

An embodiment of the access multiplexer according to the invention is characterized in that the virtual local area network connection and the permanent virtual connection define the encapsulating and the decapsulating.

The invention also relates to an Internet Protocol router for use in an access multiplexer according to the invention as defined above.

The invention also relates to a method for multiplexing Internet Protocol packets to be exchanged between a network device and a subscriber device, the Internet Protocol packets being encapsulated, between the network device and the access multiplexer, in first packets comprising first encapsulations and, between the subscriber device and the access multiplexer, in second packets comprising second encapsulations, which method according to the invention is characterized in that the method comprises the step of routing the Internet Protocol packets via direction dependent routes.

The invention also relates to a computer program product for multiplexing Internet Protocol packets to be exchanged between a network device and a subscriber device, the Internet Protocol packets being encapsulated, between the network device and the access multiplexer, in first packets comprising first encapsulations and, between the subscriber device and the access multiplexer, in second packets comprising second encapsulations, which computer program product according to the invention is characterized in that the computer program product comprises the function of routing the Internet Protocol packets via direction dependent routes.

The invention also relates to a medium comprising the computer program product according to the invention as defined above.

Embodiments of the router according to the invention and of the method according to the invention and of the computer program product according to the invention and of the medium according to the invention correspond with the embodiments of the access multiplexer according to the invention.

The invention is based upon an insight, inter alia, that a direction independent route, which for example comprises one default route, is not sufficient to handle incoming multicast/broadcast traffic at the network side of the access multiplexer as well as incoming multicast/broadcast traffic at the subscriber side of the access multiplexer, and is based upon a basic idea, inter alia, that at least two direction dependent routes are to be introduced.

The invention solves the problem, inter alia, to provide an access multiplexer as defined above that can handle routing protocols, which use multicast Internet Protocol destination addresses or broadcast Internet Protocol destination addresses, in a more sophisticated way. The access multiplexer according to the invention is further advantageous, inter alia, in that it can handle unicast traffic as well as multicast traffic as well as broadcast traffic in a sophisticated way.

BRIEF DESCRIPTION OF THE DRAWINGS

These and other aspects of the invention will be apparent from and elucidated with reference to the embodiments(s) described hereinafter.

DETAILED DESCRIPTION OF EXAMPLE EMBODIMENTS

Figure 1:
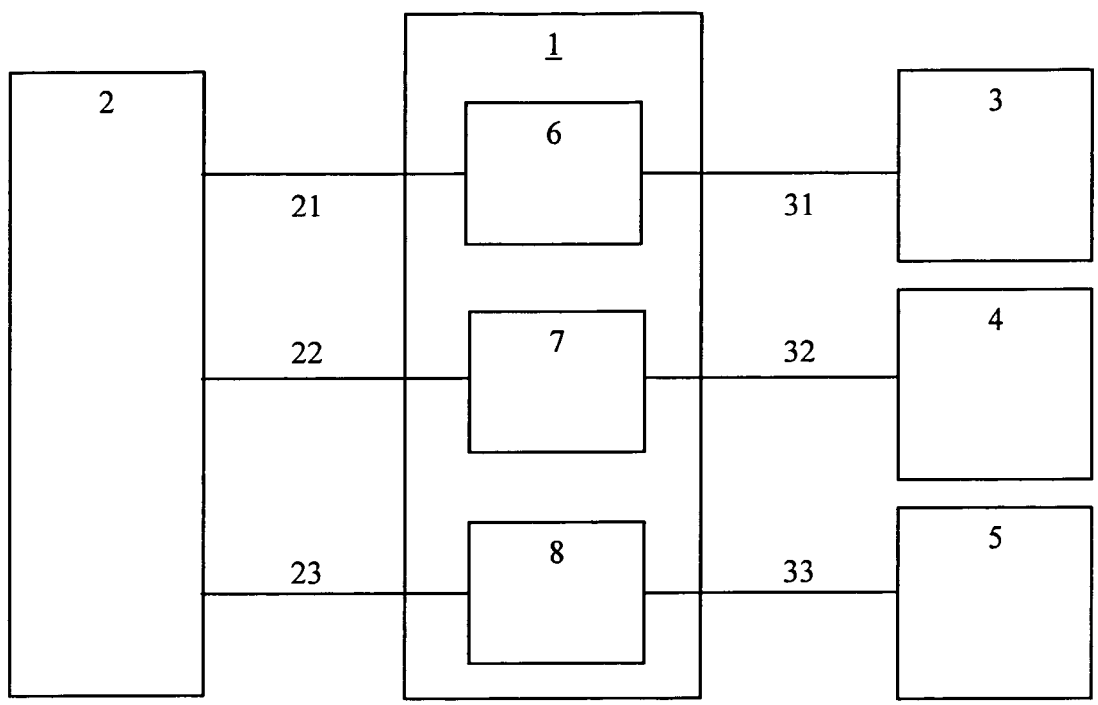
FIG. 1 shows diagrammatically an access multiplexer according to the invention coupled to a network device and to a subscriber device.

The access multiplexer 1 according to the invention shown in FIG. 1 comprises respective Internet Protocol routers 6-8 coupled via respective virtual local area network connections 21-23 to the network device 2 and coupled via permanent virtual connections 31-33 to respective subscriber devices 3-5. The Internet Protocol routers 6-8 route for example Internet Protocol packets.

Figure 2:
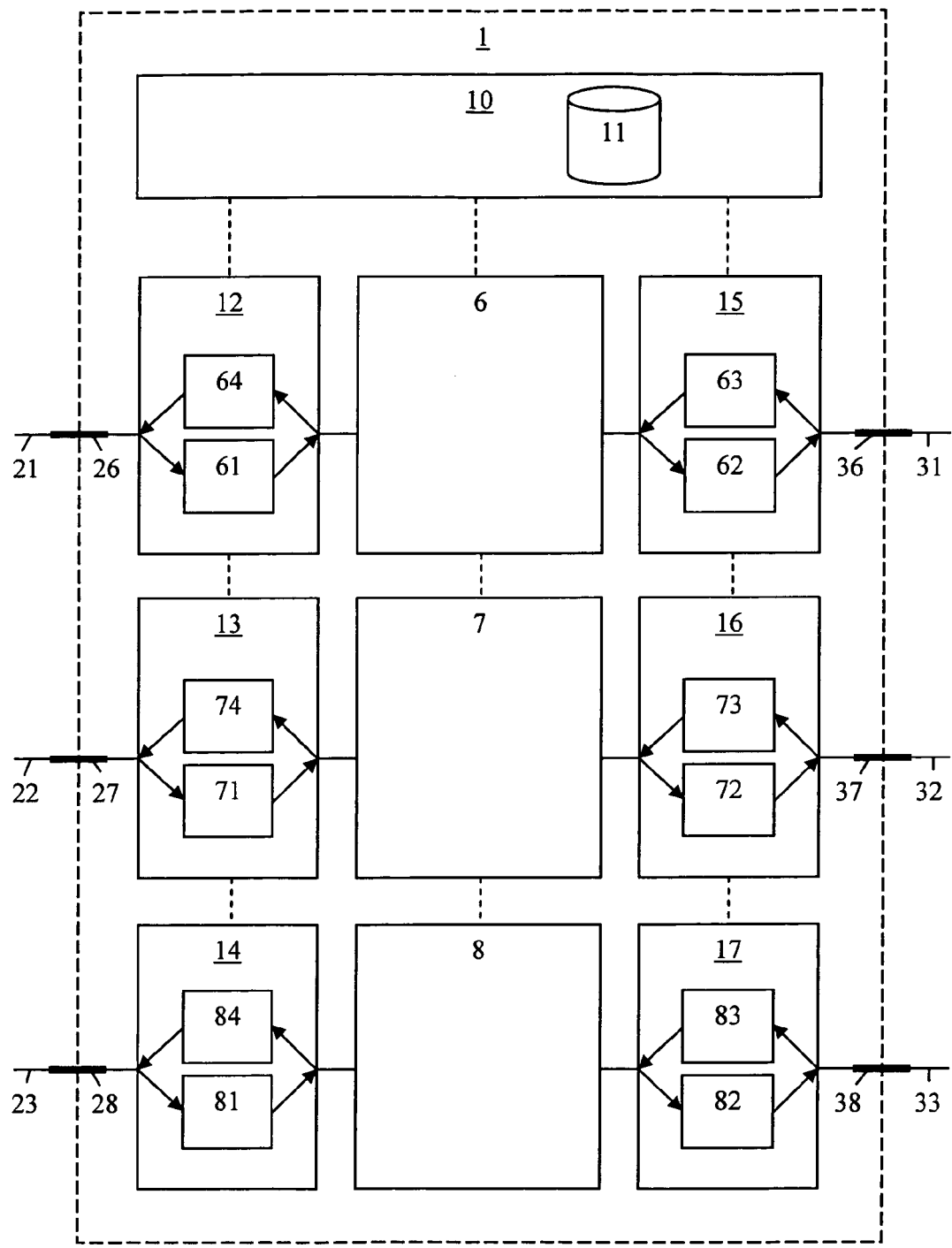
FIG. 2 shows diagrammatically in greater detail an access multiplexer according to the invention.

The access multiplexer 1 according to the invention shown in FIG. 2 comprises a controller 10 such as a processor with a memory 11 coupled to the respective Internet Protocol routers 6-8. The respective Internet Protocol routers 6-8 are coupled via respective network capsulators 12-14 to respective network couplings 26-28 that are further coupled to the respective virtual local area network connections 21-23. The respective Internet Protocol routers 6-8 are further coupled via respective subscriber capsulators 15-17 to respective subscriber couplings 36-38 that are further coupled to the respective permanent virtual connections 31-33. The respective network capsulators 12-14 comprise respective network encapsulators 64 and 74 and 84 and respective network decapsulators 61 and 71 and 81. The respective subscriber capsulators 15-17 comprise respective subscriber encapsulators 62 and 72 and 82 and respective subscriber decapsulators 63 and 73 and 83. The capsulators 12-17 are also coupled to the controller 10.

The access multiplexer 1 couples the network device 2 and the subscriber device 3 with each other and allows an exchange of Internet Protocol packets between the network device 2 and the subscriber device 3 in two directions. In a first direction, for example from network device 2 to subscriber device 3 (downstream), at the network device 2 the Internet Protocol packets are encapsulated via first encapsulations, at a network side of the access multiplexer 1 the Internet Protocol packets are decapsulated, at a subscriber side of the access multiplexer 1 the Internet Protocol packets are encapsulated via second encapsulations, and at the subscriber device 3 the Internet Protocol packets are decapsulated. In a second direction, for example from subscriber device 3 to network device 2 (upstream), at the subscriber device 3 the Internet Protocol packets are encapsulated via the second encapsulations, at a subscriber side of the access multiplexer 1 the Internet Protocol packets are decapsulated, at a network side of the access multiplexer 1 the Internet Protocol packets are encapsulated via the first encapsulations, and at the network device 2 the Internet Protocol packets are decapsulated.

In a prior art situation, the access multiplexer 1 does not allow routing protocols which use multicast Internet Protocol destination addresses or broadcast Internet Protocol destination addresses to be run transparently between the network device and the subscriber device. Instead, in the prior art, the access multiplexer terminates such routing protocols, leading to a situation where the routing protocols are respectively terminated and instantiated in the access multiplexer. A first instance runs between the network device and the access multiplexer where it is terminated and a second instance runs between the access multiplexer and the customer device. Examples of such routing protocols are the Routing Information Protocol and the Open Shortest Path First Protocol.

According to the invention, the access multiplexer 1 is provided with the Internet Protocol router 6 for routing the Internet Protocol packets via direction dependent routes. In other words, the Internet Protocol router 6 has at least two routes available, one for each direction. As a result, the access multiplexer 1 according to the invention has become transparent for routing protocols at Internet Protocol level which use multicast Internet Protocol destination addresses or broadcast Internet Protocol destination addresses. In the first direction, a first route is used and in the second direction, a second route is used.

The access multiplexer 1 according to the invention is further advantageous, inter alia, in that it can handle unicast traffic as well as multicast traffic as well as broadcast traffic in a sophisticated way. The Internet Protocol destination addresses define the traffic to be unicast traffic, multicast traffic or broadcast traffic.

The direction dependent routes might comprise at least two default routes for routing an Internet Protocol packet comprising a multicast Internet Protocol destination address or a broadcast Internet Protocol destination address from a network interface (network coupling 26-28) of the access multiplexer 1 to a subscriber interface (subscriber coupling 36-38) of the access multiplexer 1 and for routing an Internet Protocol packet comprising the multicast Internet Protocol destination address or the broadcast Internet Protocol destination address from the subscriber interface (subscriber coupling 36-38) of the access multiplexer 1 to the network interface (network coupling 26-28) of the access multiplexer 1.

Especially for the situation based on default routes and on Internet Protocol packets comprising multicast Internet Protocol destination addresses or broadcast Internet Protocol destination addresses, the invention solves the above identified problem. However, for other routes than the default routes and for other Internet Protocol packets comprising other Internet Protocol destination addresses than the multicast Internet Protocol destination addresses or the broadcast Internet Protocol destination addresses, the invention will be advantageous as well.

The first packets may be Ethernet packets with the first encapsulations being Ethernet encapsulations and in the second packets may be Asynchronous Transfer Mode packets with the second encapsulations being Asynchronous Transfer Mode encapsulations. The access multiplexer 1 may be a digital subscriber line access multiplexer and the network device 2 may comprise an edge router and the subscriber device 3 may comprise customer premises equipment. Then, the access multiplexer 1 might comprise the network coupling 26 that is coupled via the virtual local area network connection 21 to the network device 2 and the subscriber coupling 36 that is coupled via the permanent virtual connection 31 to the subscriber device 3. The first direction flows from the network coupling 26 to the subscriber coupling 36 and a second direction flows from the subscriber coupling 36 to the network coupling 26. Then, a first (default) route flows from the subscriber coupling 36 to the subscriber device 3 and a second (default) route flows from the network coupling 26 to the network device 2.

The network decapsulator 61 is coupled to the network coupling 26 for decapsulating incoming first packets, the decapsulated first packets being first Internet Protocol packets, and the subscriber encapsulator 62 is coupled to the subscriber coupling 36 for encapsulating the first Internet Protocol packets, the encapsulated first Internet Protocol packets being outgoing second packets. The subscriber decapsulator 63 is coupled to the subscriber coupling 36 for decapsulating incoming second packets, the decapsulated second packets being second Internet Protocol packets, and the network encapsulator 64 is coupled to the network coupling 26 for encapsulating the second Internet Protocol packets, the encapsulated second Internet Protocol packets being outgoing first packets. The virtual local area network connection 21 and the permanent virtual connection 31 define the necessary encapsulating and the necessary decapsulating.

The routers 6-8 or the router functions will each comprise their own and independent tables, such as Internet Protocol tables defining the couplings 26-28 and 36-38 and Forwarding Information Base tables and Address Resolution Protocol tables. In the access multiplexer 1, each one of the routers 6-8 or each one of the router functions will act completely independent from the others and without any interaction taking place between them.

The fact that the routes are Internet Protocol destination address direction independent (the Internet Protocol destination address is only used for detecting that an Internet Protocol packet comprises multicast or broadcast traffic) does not exclude that, for example in the second direction from the subscriber device 3 to the network device 2, some information might be retrieved from the Internet Protocol destination addresses, for example to define a Medium Access Control address necessary to define the network device 2 via the virtual local area network connections 21-23.

More specifically, according to the prior art, that requires that routing protocols are terminated in the access multiplexer itself, a migration is impossible from, on the one hand, an access network where Internet Protocol over Asynchronous Transfer Mode subscriber devices are connected to the access network via an Asynchronous Transfer Mode access multiplexer to, on the other hand, an access network where Internet Protocol over Asynchronous Transfer Mode subscriber devices are connected to the access network via an Ethernet access multiplexer, without changing anything in an existing Internet Protocol configuration in the subscriber devices and in the network device. For a specific situation of one subnet end-to-end between the network device (with Ethernet termination) and the subscriber device (with Asynchronous Transfer Mode termination), classical intermediate access nodes (access multiplexers) are not capable of handling this network device to subscriber device end-to-end traffic, with a subnet of for example size "/30" or "/31" or even generalized to "/32".

By providing an Ethernet/Asynchronous Transfer Mode terminating Internet Protocol access multiplexer with one or more modules, each one of the one or more modules being capable of avoiding the Internet Protocol numbering of the interfaces such as the couplings 26-28 and 36-38 such that all interfaces at both sides of the access multiplexer become unnumbered (contrary to the prior art situation that requires this numbering for at least one interface) and each one of the one or more modules being capable of configuring the access multiplexer via for example Forwarding Information Base tables with a one-to-one bi-directional association (made of two unidirectional routes) between one interface at the Asynchronous Transfer Mode side to one interface at the Ethernet side, the access multiplexer has become transparent to Internet Protocol traffic in both directions, including broadcast and multicast traffic, which is a great advantage.

These results are obtained by means of the modules in the form of the routers 6-8 (or router functions) to be added to the access multiplexer for firstly exclusively considering unnumbered Internet Protocol interfaces and secondly completing the Forwarding Information Base table such that at least two distinct uni-directional routes are created between a unique interface at the Asynchronous Transfer Mode (subscriber device) side and a unique interface at the Ethernet (network device) side.

So, compared to the prior art, there is no Internet Protocol address configured per interface in the access multiplexer, there are bi-directional Internet Protocol Forwarding Information Base containing unidirectional routes, there is transparency to multicast and broadcast Internet Protocol traffic and there are one upstream and one downstream default routes to be configured. This all allows an implementation of an Internet Protocol crossconnect at low design costs starting from standard prior art access multiplexers.

In FIGS. 1 and 2, each coupling/connection may be a wired coupling/connection or a wireless coupling/connection. Any unit shown may be divided into sub-units, and any two or more units may be integrated into a new and larger unit. Any unit shown may comprise hardware and/or software. The computer program product according to the invention may be stored on a fixed medium such as the memory 11 or a removable medium not shown. The capsulators 12-17 may comprise further hardware and/or software such as splitters and combiners and interfaces etc.

The expression "for" in for example "for establishing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude a possible presence of one or more pluralities.

The steps and/or functions of routing do not exclude further steps and/or functions, like for example, inter alia, the steps and/or functions described for the Figures etc.

What is claimed is:

1. An access multiplexer for multiplexing Internet Protocol packets to be exchanged between a network device and a subscriber device, wherein
    the Internet Protocol packets being exchanged between the network device and the access multiplexer are encapsulated by the access multiplexer into first packets including first encapsulations,
    the Internet Protocol packets being exchanged between the subscriber device and the access multiplexer are encapsulated by the access multiplexer into second packets including second encapsulations,
    the access multiplexer includes an Internet Protocol router for routing the Internet Protocol packets via direction dependent routes, the direction dependent routes being based on a destination address and including a first route for routing the Internet Protocol packets in the downstream direction and a second route for routing the Internet Protocol packets in the upstream direction, the first route and the second route being different routes, and
    the direction dependent routes include at least two default routes for routing an Internet Protocol packet from a network interface of the access multiplexer to a subscriber interface of the access multiplexer including,
    a multicast Internet Protocol destination address, and
    a broadcast Internet Protocol destination; and
    the direction dependent routes for routing an Internet Protocol packet from the subscriber interface of the access multiplexer to the network interface of the access multiplexer include,
    the multicast Internet Protocol destination address, and
    the broadcast Internet Protocol destination address.

2. The access multiplexer of claim 1, wherein
    the first packets are Ethernet packets with the first encapsulations being Ethernet encapsulations, and
    the second packets are Asynchronous Transfer Mode packets with the second encapsulations being Asynchronous Transfer Mode encapsulations.

3. The access multiplexer of claim 1, wherein
    the access multiplexer is a digital subscriber line access multiplexer,
    the network device includes an edge router, and
    the subscriber device includes customer premises equipment.

4. The access multiplexer of claim 1, wherein
    the access multiplexer includes a network coupling that is coupled via a virtual local area network connection to the network device, and
    a subscriber coupling that is coupled via a permanent virtual connection to the subscriber device.

5. The access multiplexer of claim 4, wherein
    a first direction flows from the network coupling to the subscriber coupling,
    a second direction flows from the subscriber coupling to the network coupling,
    a first route flowing from the subscriber coupling to the subscriber device, and
    a second route flowing from the network coupling to the network device.

6. The access multiplexer of claim 5, wherein
    the access multiplexer includes a network decapsulator coupled to the network coupling for decapsulating incoming first packets, the decapsulated first packets being first Internet Protocol packets, and
    a subscriber encapsulator coupled to the subscriber coupling for encapsulating the first Internet Protocol packets, the encapsulated first Internet Protocol packets being outgoing second packets.

7. The access multiplexer of claim 5, wherein the access multiplexer includes a subscriber decapsulator coupled to the subscriber coupling for decapsulating incoming second packets, the decapsulated second packets being second Internet Protocol packets, and a network encapsulator coupled to the network coupling for encapsulating the second Internet Protocol packets, the encapsulated second Internet Protocol packets being outgoing first packets.

8. The access multiplexer of claim 6, wherein the virtual local area network connection and the permanent virtual connection define the encapsulating and the decapsulating.

9. A method for multiplexing Internet Protocol packets to be exchanged between a network device and a subscriber device, the method comprising:

exchanging the Internet Protocol packets between the network device and the access multiplexer, wherein the access multiplexer encapsulates the Internet Protocol packets into first packets including first encapsulations;

exchanging the Internet Protocol packets between the subscriber device and the access multiplexer, wherein the access multiplexer encapsulates the Internet Protocol packets into second packets including second encapsulations; and routing the Internet Protocol packets via direction dependent routes, the direction dependent routes being based on a destination address and including a first route for routing the Internet Protocol packets in the downstream direction and a second route for routing the Internet Protocol packets in the upstream direction, the first route and the second route being different routes, wherein the direction dependent routes include at least two default routes for routing an Internet Protocol packet from a network interface of the access multiplexer to a subscriber interface of the access multiplexer including, a multicast Internet Protocol destination address, and a broadcast Internet Protocol destination; and the direction dependent routes for routing an Internet Protocol packet from the subscriber interface of the access multiplexer to the network interface of the access multiplexer include, the multicast Internet Protocol destination address, and the broadcast Internet Protocol destination address.

10. A non-transitory computer readable medium storing computer-executable instructions for execution by a computer processor for multiplexing Internet Protocol packets to be exchanged between a network device and a subscriber device, wherein the Internet Protocol packets being exchanged between the network device and the access multiplexer are encapsulated by the access multiplexer into first packets including first encapsulations, the Internet Protocol packets being exchanged between the subscriber device and the access multiplexer are encapsulated by the access multiplexer into second packets including second encapsulations, the computer program includes the function of routing the Internet Protocol packets via direction dependent routes, the direction dependent routes being based on a destination address and including a first route for routing the Internet Protocol packets in the downstream direction and a second route for routing the Internet Protocol packets in the upstream direction, the first route and the second route being different routes and the direction dependent routes include at least two default routes for routing an Internet Protocol packet from a network interface of the access multiplexer to a subscriber interface of the access multiplexer including, a multicast Internet Protocol destination address, and a broadcast Internet Protocol destination; and the direction dependent routes for routing an Internet Protocol packet from the subscriber interface of the access multiplexer to the network interface of the access multiplexer include, the multicast Internet Protocol destination address, and the broadcast Internet Protocol destination address.

* * * * *